United States Patent [19]

Verlinden

[11] 4,114,683
[45] Sep. 19, 1978

[54] FLEXIBLE TUBE TYPE FLUID-FLUID HEAT EXCHANGER

[75] Inventor: Michel Francois Emile Jacques Verlinden, Brussels, Belgium

[73] Assignee: Hamon Sobelco S.A., Brussels, Belgium

[21] Appl. No.: 760,690

[22] Filed: Jan. 19, 1977

[30] Foreign Application Priority Data

Aug. 18, 1976 [FR] France .............................. 76 25059

[51] Int. Cl.² .............................................. F28F 9/00
[52] U.S. Cl. .......................................... 165/78; 165/83; 165/125; 165/178; 165/DIG. 1; 165/DIG. 8
[58] Field of Search ............... 165/125, 162, 172, 173, 165/175, 178, 180, 78, 82, 83, DIG. 1, DIG. 8

[56] References Cited

U.S. PATENT DOCUMENTS

| | | | |
|---|---|---|---|
| 2,143,157 | 1/1939 | Kotzebue | 165/175 |
| 3,077,226 | 2/1963 | Matheny | 165/125 |
| 3,223,155 | 12/1965 | Hubbard | 165/125 |
| 3,315,740 | 4/1967 | Withers | 165/172 |
| 3,545,537 | 12/1970 | Hill, Jr. | 165/172 |
| 3,822,553 | 7/1974 | Grahn | 165/125 |
| 3,981,354 | 9/1976 | Haberski | 165/125 |
| 4,030,540 | 6/1977 | Roma | 165/172 |
| 4,036,289 | 7/1977 | Cheng et al. | 165/172 |

FOREIGN PATENT DOCUMENTS 352,089 3/1961 Switzerland .............................. 165/125

*Primary Examiner*—Charles J. Myhre
*Assistant Examiner*—Sheldon Richter
*Attorney, Agent, or Firm*—Harold L. Stowell

[57] ABSTRACT

A fluid-fluid heat exchanger comprises a plurality of flexible synthetic tubes extending in a curved path between a pair of headers with the tubes being maintained in a plurality of spaced apart superimposed layers by a plurality of spaced apart generally radially disposed spacers.

12 Claims, 12 Drawing Figures

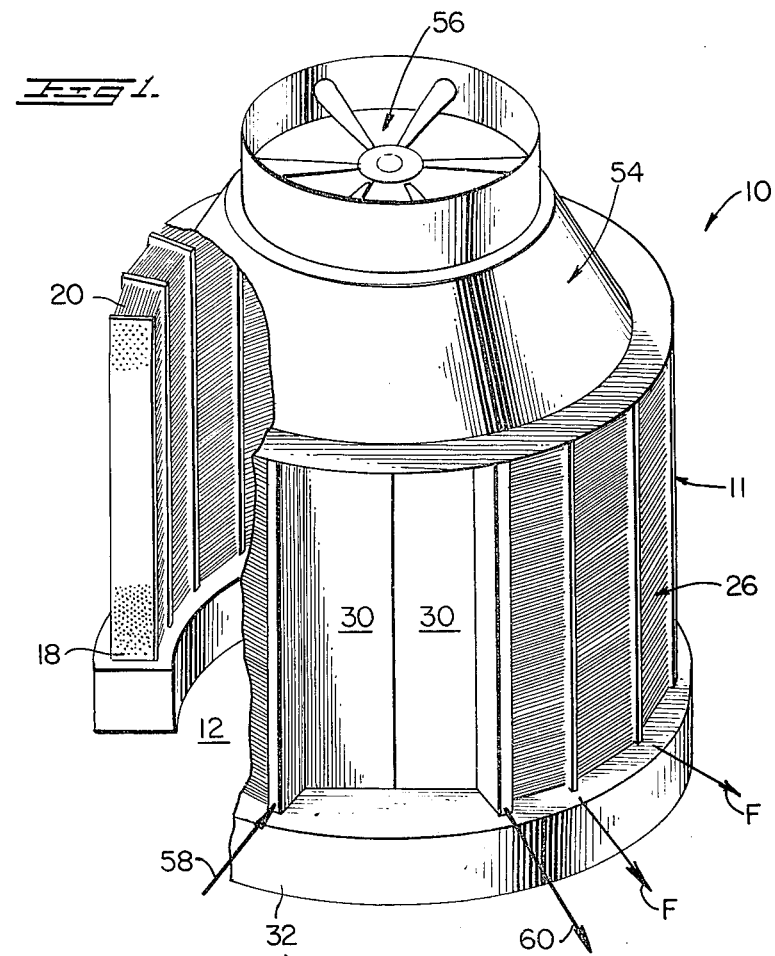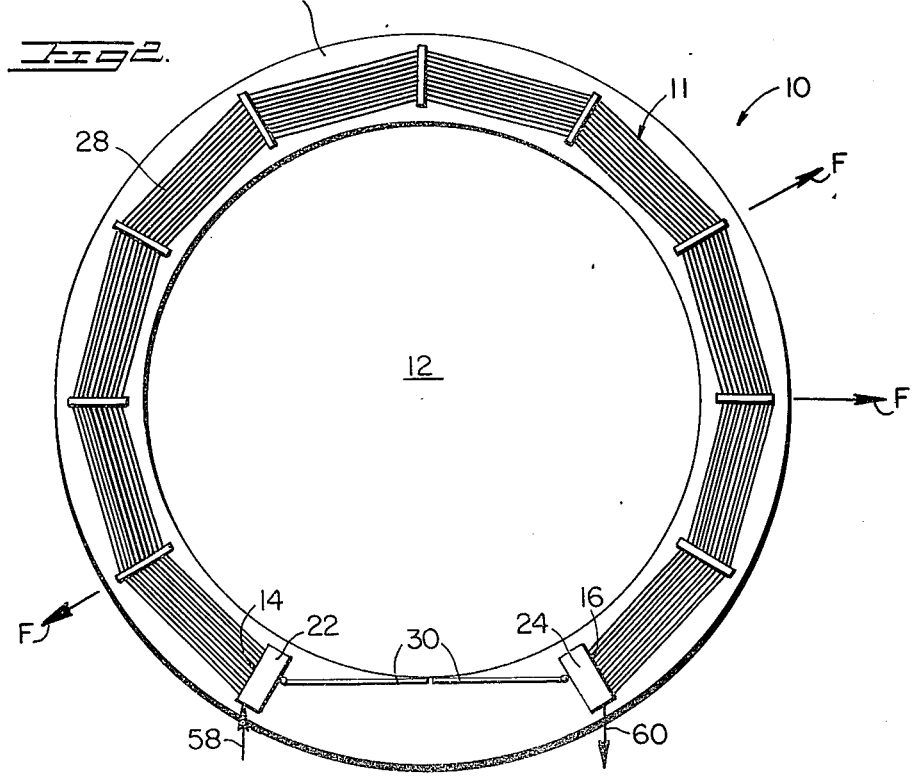

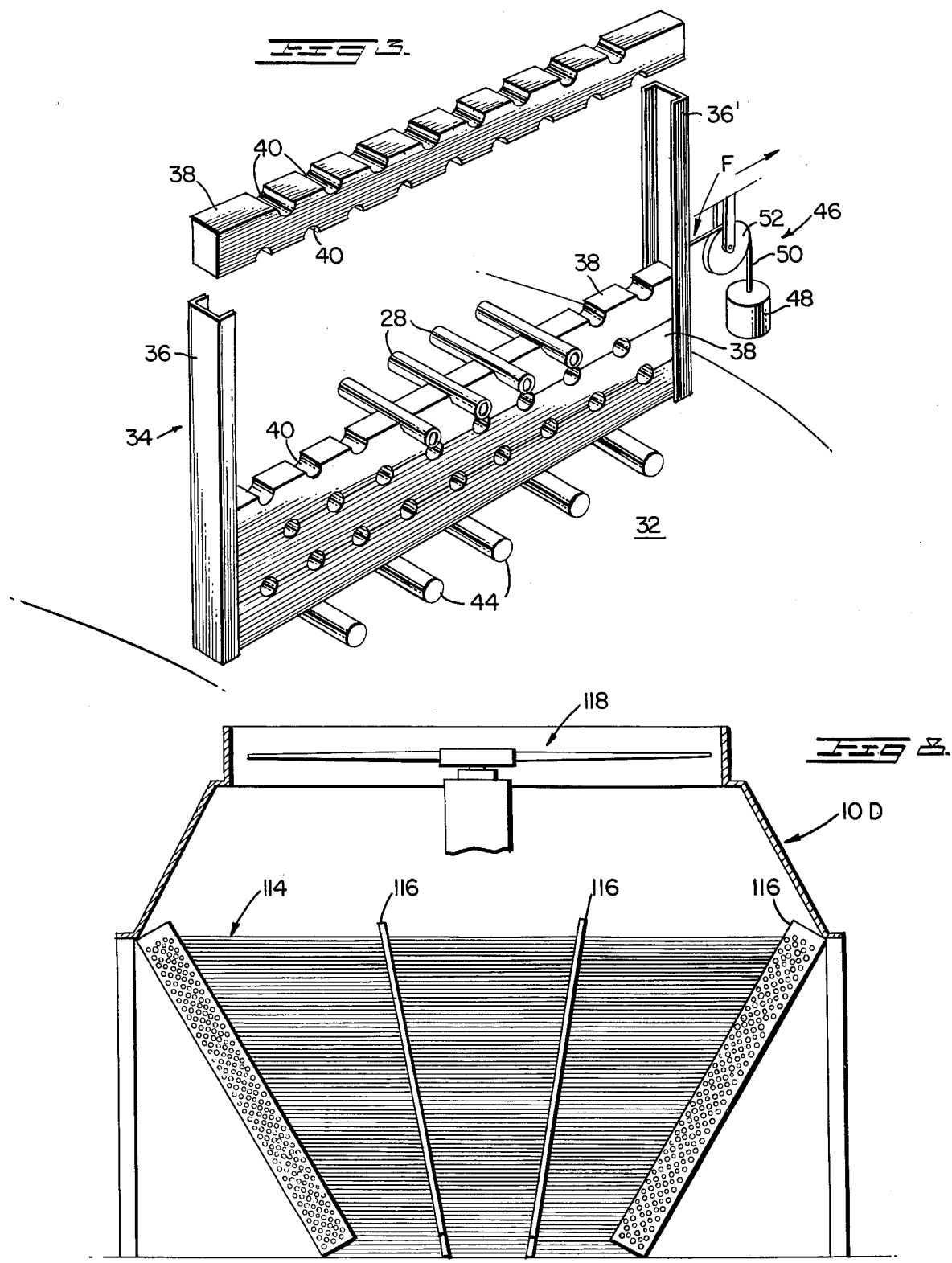

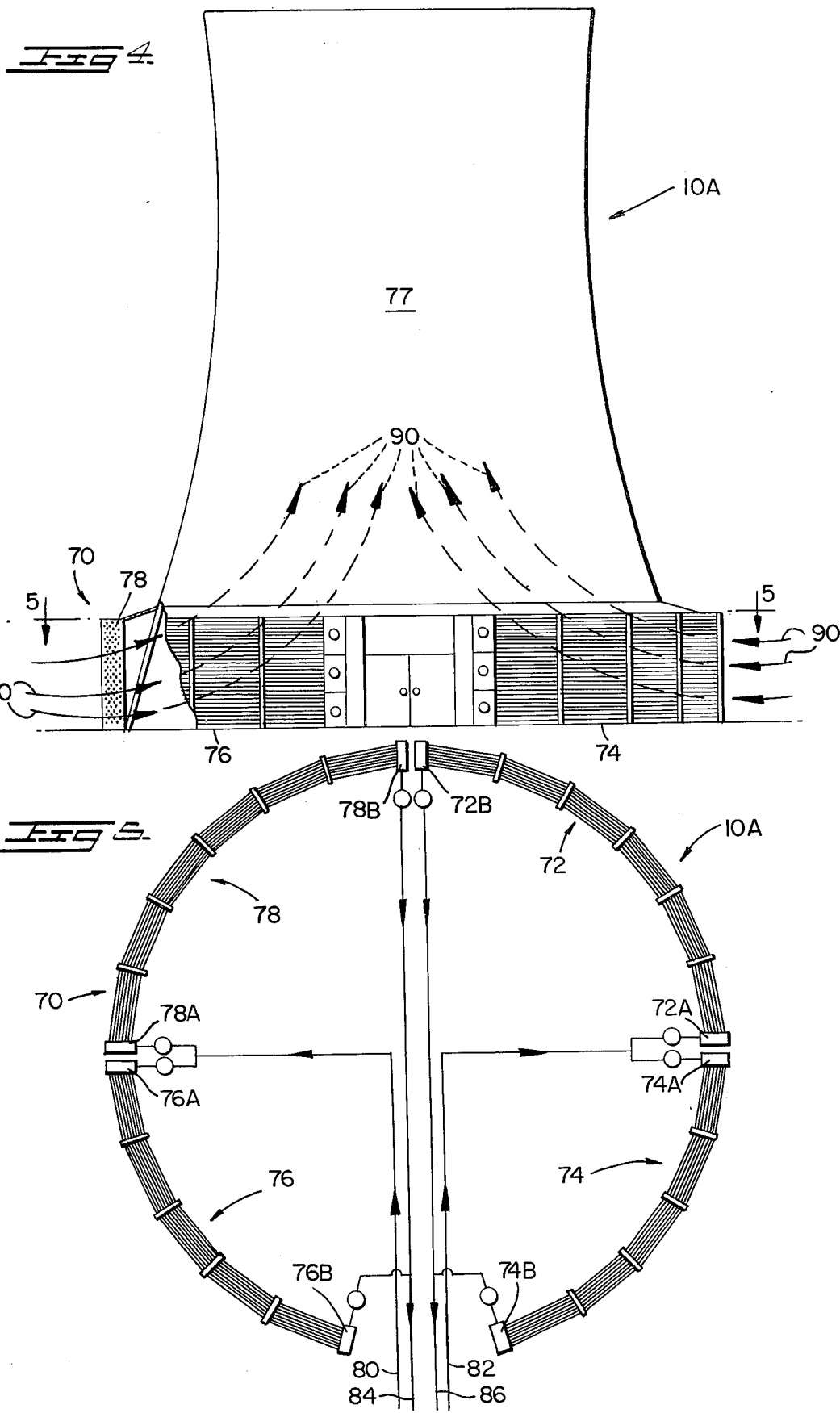

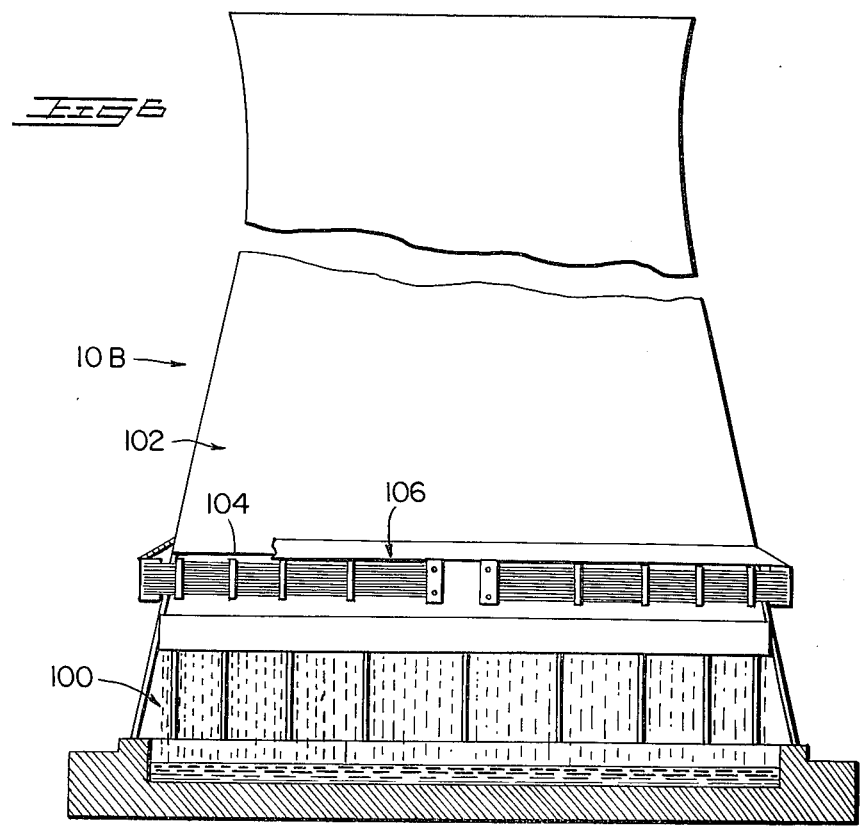
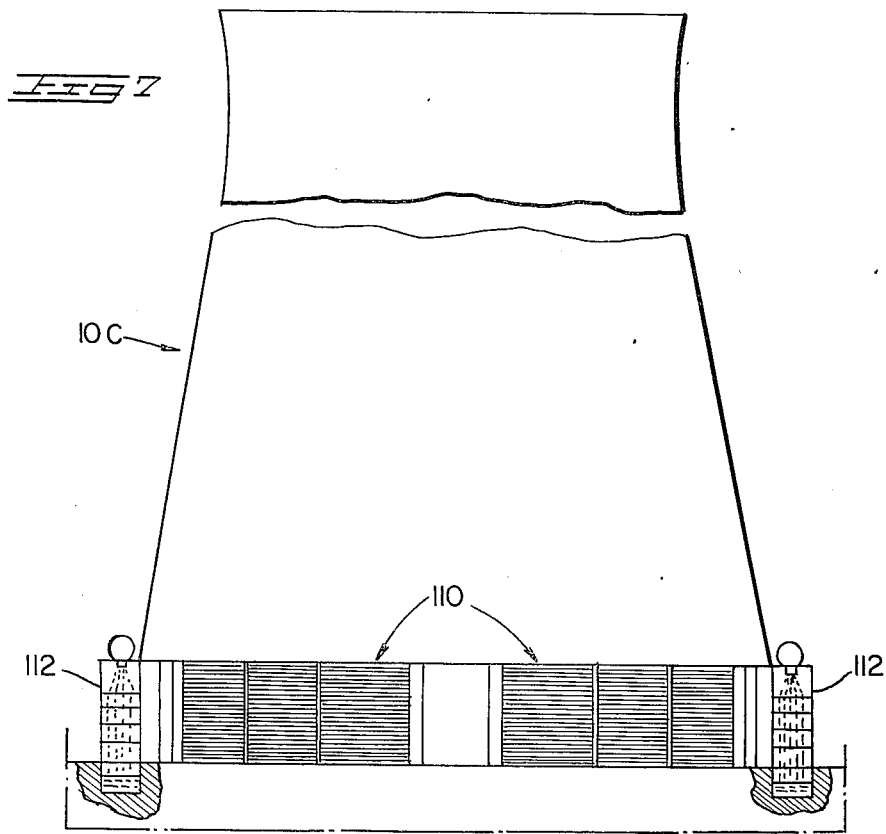

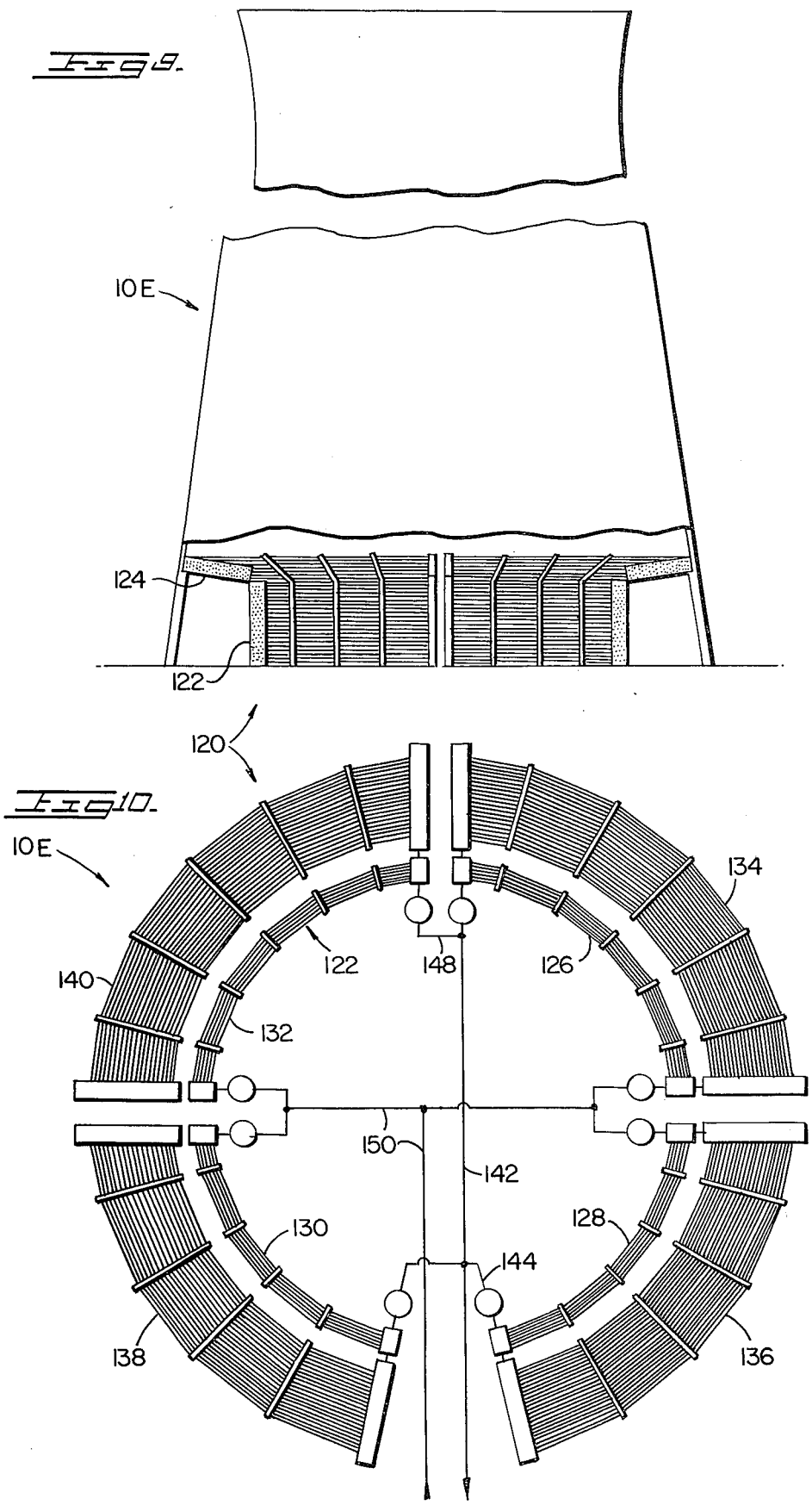

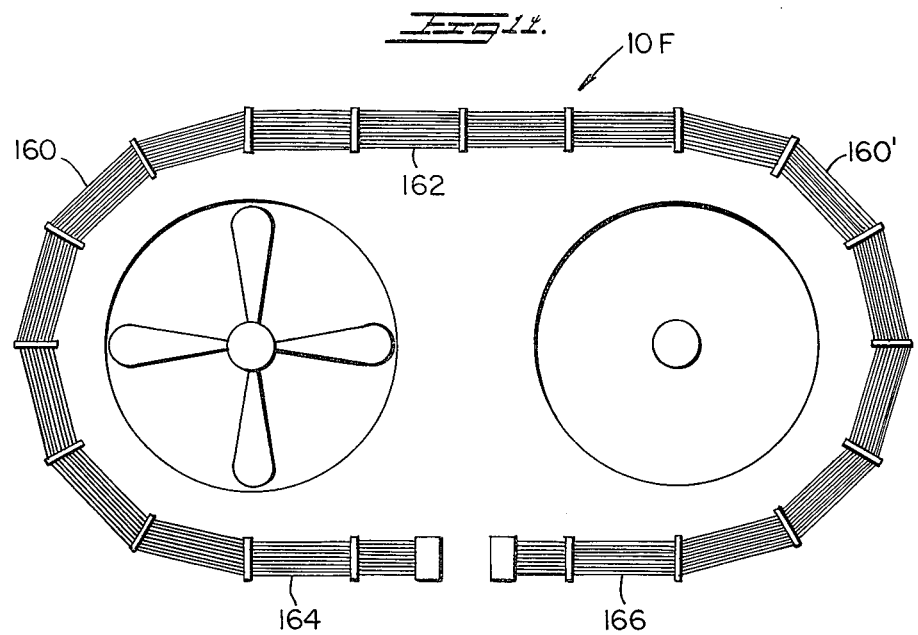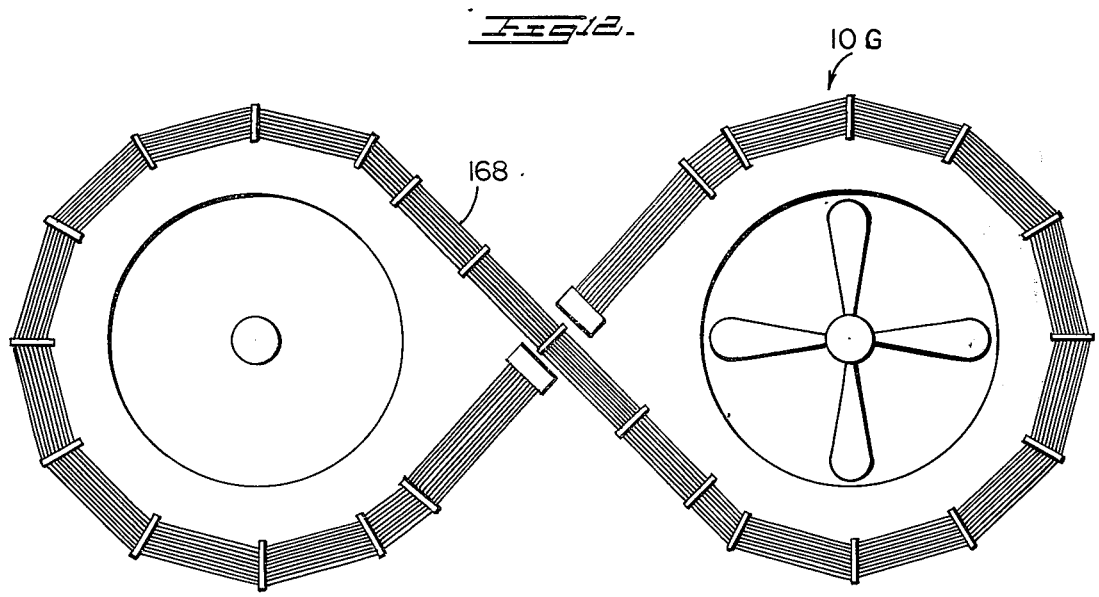

4,114,683

FLEXIBLE TUBE TYPE FLUID-FLUID HEAT EXCHANGER

BACKGROUND OF THE INVENTION

The present invention relates to heat exchangers of the "dry" type effecting an exchange between a first fluid, such as a gas, steam or liquid, for example water, and a second fluid, for example air, which is separated from the first fluid by a wall.

Such a heat exchanger usually comprises at least one heat exchange wall defining at least partly an inner volume or chamber which communicates with the exterior by way of at least one outlet orifice, the wall comprising an assembly of spaced tubes in which the first fluid flows and wherein the spaces between the tubes provide the passages for the flow of the second fluid.

According to a conventional form of construction, the tubes of such a heat exchanger are made from metal and are usually finned to increase the heat exchange surface. These tubes are united in batteries, each comprising a nest of parallel, usually rectilinear, tubes connected at their ends to a header. For ease of construction and transportation, the batteries of finned tubes are limited in overall size, and this results particularly in large exchangers, in multiplying the number of batteries and hence the number of connections of the tubes to the water-boxes and of the batteries to each other. Consequently, such heat exchangers are very costly.

These metal finned tubes are also highly sensitive to corrosion and to soiling in an industrial atmosphere and it has been proposed to replace the metal finned tubes by smooth tubes of plastics material without, however, departing from the aforementioned traditional assembly method. However, owing to the fact that the heat exchanger surface of a smooth tube is less than that of a finned tube of the same length, it is necessary to increase the number of tubes employed and the number of tube connections. Consequently, this form of construction is just as costly as using finned metal tubes.

SUMMARY OF THE INVENTION

An object of the present invention is to provide a heat exchanger which is cheaper in construction from the point of view of labor and materials.

According to the invention, there is provided a heat exchanger consisting of a pair of headers, a plurality of flexible synthetic tubes, each of the plurality of tubes extending in a curved path between the pair of headers with the ends of each tube being in fluid communication with the pair of headers to provide a flow path between the headers for one of the heat exchange fluids, the plurality of tubes being further arranged in a plurality of spaced superimposed layers with the spaces therebetween providing a flow path for the other of the heat exchange fluids, and a plurality of spaced generally radially disposed spacers engaging and maintaining the flexible tubes in their spaced superimposed layers and in their generally curved path.

Owing to these features, it is now possible to employ in the construction of such an exchanger, flexible tubes of great length which may be brought to the site and cut into sections of the required length. Consequently, it is possible to eliminate most of the water-boxes or intermediate headers the use of which is required in conventional exchangers using tube sections of standard length. Further, by using flexible tubes, it is possible to wind them into coils of very large developed length which facilitates their transportation to the site of erection of the exchanger.

Further, features of the invention will be apparent from the ensuing description.

BRIEF DESCRIPTION OF THE DRAWING

In the accompanying drawings, given solely by way of example:

FIG. 1 is a diagrammatic perspective view, partly in section, of an exchanger according to the invention;

FIG. 2 is a diagrammatic horizontal sectional view of the exchanger of FIG. 1;

FIG. 3 is a perspective view, to an enlarged scale, of the spacer means for the layers of tubes employed in the exchanger of FIG. 1;

FIG. 4 is a view of an exchanger of the natural draught type of high thermal capacity constructed in accordance with the principles of the invention;

FIG. 5 is a diagrammatic horizontal section on line 5—5 of the exchanger of FIG. 4;

FIG. 6 is a diagrammatic elevational view of an exchanger of the mixed dry and wet type employing a natural draught and comprising the arrangements according to the invention;

FIG. 7 is a view of a modified exchanger like the exchanger shown in FIG. 6;

FIG. 8 is a diagrammatic elevational and sectional view of an induced-draught exchanger constructed in accordance with the principles of the invention;

FIG. 9 is a view of another embodiment of the invention applied to an exchanger of the natural-draught type;

FIG. 10 is a diagrammatic horizontal sectional view of the exchanger of FIG. 9, and FIGS. 11 and 12 are views of two other embodiments of the invention.

DESCRIPTION OF THE PREFERRED EMBODIMENTS

In the embodiment shown in FIGS. 1 to 3, a heat exchanger 10 according to the invention comprises a heat exchange wall 11 which has a generally cylindrical shape with a vertical axis and defines an inner volume or chamber 12. This wall 11 comprises two opposite, vertical, rectilinear edges 14 and 16, FIG. 2, and two curved surfaces 18 and 20, FIG. 1, which are circular in the presently-described embodiment. Extending in this wall between vertical headers 22 and 24 located at the edges 14 and 16 are layers 26 of tube sections 28 which conform to the curvature of the wall 11 and are parallel to the edges 18 and 20. Doors 30 give access to the chamber or inner volume 12 and are disposed between the headers 22 and 24.

The tubes 28 are constructed of a flexible plastic material so that they may easily conform to the curvature of the wall 11. The tubes 28 are connected to the headers 22 and 24 by any suitable method, such as insertion, jamming, welding, adhesion, etc. as is known in the art.

The entire wall 11 is mounted on a circular base 32 by way of spacer units 34 which are preferably constructed as shown in FIG. 3. As shown, each spacer unit 34 comprises two vertical U-section members 36-36' contained in a radial plane of the wall 11. Disposed horizontally in these U-section members 36-36' are strips 38 which are superimposed and each has a series of half round notches 40, the axis of which extend transversely and the radii of which is greater than, or substantially equal to, the radius of a cross-section of a tube 28. Thus, as these strips are suitably superimposed, they define apertures in which the tubes 28 may be inserted when assembling the exchanger.

In the illustrated embodiment, the row of notches 40 located on one side of each strip 38 is offset half a pitch between successive notches from the row on the other side, so that the apertures are disposed in staggered relation when assembled into spacer unit and the superimposed layers or sheets of tubes are slightly offset from one layer to the other. It will be understood that the apertures may also be in vertical alignment or disposed in any other desired arrangement. The strips 38 may be constructed from any suitable material such as metal, plastic, wood or combinations thereof. It will also be understood that there may be provided, in lieu of the spacer elements just described one piece perforated plates through which the tubes may be inserted.

In order to compensate for the bending of the tubes 28 due to thermal expansion each spacer element 34 may rest on rollers 44 supported on the base 32 while a radially outward pulling force or device 46 is connected to each spacer element to exert thereon an outward radial force F. This force F maintains tension in the tubes 28. The pulling device 46 may comprise a simple weight 48 which is attached to the spacer element 36' through an assembly comprising a cable 50 and a pulley 52, but the force may also be provided by springs, jacks or other suitably-arranged means of this type.

The upper end of the chamber 12 is closed by a hood 54 in which there is disposed a fan 56 to produce a mechanical draft.

The fluid circulating in the tubes 28 (preferably hot water) may enter the exchanger through header 22 as shown by arrow 58 and travel through, in parallel, the whole of the nest of tubes which constitutes the wall 11 and exit via header 24 as shown by arrow 60.

By appropriate partitioning of the headers 22 and 24 into compartments, the fluid may be caused to flow in a plurality of passages through selected groups of tubes and thereafter issue therefrom by way of the opposite header or by way of the same header, according to the connections provided and according to whether the number of passages is even or uneven.

A basic objective of the arrangement according to the invention resides in the fact that it is possible to employ tubes of very great length (namely, in the presently-described case, lengths roughly equal to the perimeter of the exchanger), thereby limiting the number of headers and tube connections. Further, since the exchanger is supported directly on the base 32 via the spacer elements 34 and headers 22 and 24 there is eliminated costly support structures for the tubes of the exchanger.

Moreover, the arrangement of the invention results in an excellent circular symmetry which in turn results in good distribution of the gaseous cooling fluid (for example, air).

In industrial environments, often charged with dust, the use of tubes of smooth synthetic material provides a definite advantage over finned metal tubes of the prior art. Thus, owing to the absence of fins, the soiling or clogging of the tubes is reduced to a minimum and maintenance becomes easier and may only be required at considerable intervals of time.

Notwithstanding the length of the tubes and the overall size of the exchanger, the pre-assembly of the complete annular exchanger in the workshop is conceivable, but this manner of proceeding creates transportation and erection problems of a complete assembly.

It is easier to visualize construction of the exchanger according to the invention on the site by assembly of the headers 22 and 24 and intermediate spacer elements 34, and finally passing the tubes 28 through the annular assembly.

In this mode of assembly, the tubes may be easily and cheaply brought to the site on a reel and may therefore have considerable length. Bearing in mind the thickness of the wall of tubes, the tubes of the inner ring of the exchanger are necessarily shorter than the tubes of the exterior ring and this difference distributed over the thickness of the wall could pose problems of cutting the tubes to length and the selection of the tubes in a pre-assembly in the workshop. However, in the case of assembly on the site, such as described hereinbefore, the tubes are inserted in the spacer elements 34 and fixed to the headers and cut to length directly on the site.

A method of assembly different from the insertion of the tubes on the site and of the overall pre-assembly of the exchanger in the workshop consists in the pre-assembly in the workshop or on the site of each horizontal layer of tubes in the spacers 38.

These layers, when they are assembled in the workshop, are wound onto themselves for transportation and the assembly of the annular exchanger on the site then corresponds to the superimposition of each one of the horizontal layers of tubes pre-assembled in the workshop. In this type of assembly, the spacer elements would comprise a series of strips 38 as shown in FIG. 3.

Another embodiment of the invention is shown in FIGS. 4 and 5. In FIGS. 4 and 5, a cooler or heat exchanger 10A of large thermal capacity, such as employed, for example, as cooling means for water circulating in steam generating stations is illustrated. In FIGS. 4 and 5, the wall 70 of the exchanger comprises a plurality of wall portions 72, 74, 76 and 78 constructed substantially indentical to that of the wall 11 of the form of the invention shown in FIGS. 1–3. In this case, each wall portion terminates in two vertical headers 72A and 72B; 74A and 74B, etc. which are suitably connected in series, or in parallel, to hot fluid supplies 80–82 and return lines 84–86. As shown, the exchanger of this embodiment is associated with a tower 77 of the natural draught type. Cooling air flow through the tower is shown by arrows 90.

FIGS. 6 and 7 show two other applications of the exchanger according to the invention, in which the dry cooling of the fluid flowing in the tubes is associated with a wet cooling section. A cooler of this type is in particular intended to reduce the visible wreath of vapour issuing from conventional wet towers employing evaporation and also to reduce the loss of water by evaporation as is known in the art.

The cooler 10B of FIG. 6 comprises a wet exchanger 100 disposed at the base of a natural draught tower 102. Below the lintel 104 of the tower and above the wet exchanger 100 is provided an exchanger 106 of the type described with reference to FIGS. 1 to 4. The air flows through the exchangers in parallel, whereas the circulation of the water is in series in the two exchangers 106 and 100. The wet exchanger 100 is in this form of the invention of the counter-current type, but it could be of the cross-current type.

FIG. 7 shows a similar cooler 10C in which the exchanger 110, of dry type according to the invention, is disposed coaxially with a conventional wet exchanger 112 which is of the cross-current type and surrounds the dry exchanger 110. In this case, the two exchangers are arranged in series in respect to the cooling air.

It will be understood that it is possible to visualize similar arrangements of the wet and dry exchangers of FIGS. 6 and 7, with a forced draught tower instead of the illustrated natural draught towers. Moreover, the circulation of the water in the pair of exchangers may be in series or in parallel.

In FIG. 8, another embodiment of the invention is shown in which a wall 114 of the exchange 10D is constructed in a similar manner to the wall 11 of FIGS. 1 to 3 and has a frustoconical upwardly-divergent configuration. In this case, the headers (not shown) and the spacer elements 116 are inclined to the vertical. As shown, this exchanger may be of the mechanical-draught type and the assembly includes a fan 118, but it will be understood that this exchanger arrangement may be mounted in a natural draught type tower.

Another embodiment of the invention is shown in FIGS. 9 and 10. In this case, the exchanger 10E comprises a generally circular wall 120 having a vertical axis, its radial section having a angular configuration. The wall 120 has a cylindrical lower part 122 on which there is mounted a frustoconical part 124, the two parts being constructed in a manner similar to that of the wall 11 of FIGS. 1 to 3. It can also be seen that the wall 120 is divided angularly into a plurality of sectors designated 126, 128, 130 and 132 for cylindrical portion 122 and 134, 136, 138 and 140 for portion 124.

These sectors are provided with fluid to be cooled via conduit 142 and branch lines 144 and 148. The return conduits are collectively designated 150. The headers and spacers of the type illustrated in FIGS. 1, 2 and 3 are clearly illustrated in FIG. 10.

The cooler of FIGS. 9 and 10 has a shape similar to that described and shown in the French Pat. No. 75 23 586 in the name of the applicant.

FIGS. 11 and 12 show various possible wall modifications 10F and 10G. That of FIG. 11 comprises two hemi-cylindrical portions 160 and 160' interconnected by planar portions 162, 164 and 166, the assembly being designed, as in the embodiment of FIGS. 1 to 3, with layers of tubes and spacer elements.

In FIG. 12, the profile of the wall 168 has substantially the shape of a figure eight.

In conclusion, it can thus be seen that, owing to the features of the invention, various configurations of exchangers are possible, and the assembly thereon can be carried out on the site in accordance with the same principles set forth hereinbefore with reference to FIGS. 1 to 3.

It will also be appreciated that depending on the flexibility of the tubes of plastics material employed they may extend in curved lines or straight lines between the various adjacent spacer elements, the curvature as a general rule being more pronounced in the region of the spacer elements than therebetween. It is even possible, in the region of the spacer elements or headers for the tubes to be angled, in which case the perimeter of the wall will be made up of rectilinear segments. This particular configuration is considered to be encompassed by the expression "curvature" of the wall in the present specification and claims.

I claim:

1. A fluid-fluid heat exchanger comprising a pair of headers, a plurality of flexible synthetic tubes, each of said plurality of tubes extending in a curved path between said pair of headers with the ends of each tube being in fluid communication with said pair of headers to provide a flow path between the headers for one of the heat exchange fluids, said plurality of tubes being further arranged in a plurality of spaced superimposed layers with the spaces therebetween providing a flow path for the other of the heat exchange fluids, a plurality of spaced generally radially disposed spacers engaging and maintaining the flexible tubes in their spaced superimposed layers and in their generally curved path, wherein each spacer has a generally plate shape disposed radially with respect to the curvature of said wall and each spacer having individual apertures for reception of the tubes of the exchanger, further wherein each spacer comprises an assembly of superimposed strips having on two opposed longitudinal sides rounded notches the radius of which is equal to, or greater than, the radius of a cross-section of said tubes, the notches of adjacent strips defining said individual apertures, and wherein said strips are maintained at their ends by U-section members disposed in the plane of the spacer element.

2. A heat exchanger as defined in claim 1 wherein means producing a radial force is associated with at least some of said spacer elements so as to compensate for the effects of expansion of said tubes.

3. A heat exchanger as defined in claim 1, wherein said heat exchanger has two semi-cylindrical portions connected by two rectilinear portions.

4. A heat exchanger as defined in claim 1, wherein said heat exchanger has the shape of an eight.

5. A heat exchanger as defined in claim 1, wherein said exchanger is associated with a further heat exchanger of the wet type which is connected in series or in parallel therewith in the flow of said one of the heat exchange fluids.

6. A heat exchanger as defined in claim 1, wherein said curved path has the shape of a cylinder.

7. A heat exchanger as defined in claim 6, wherein the tubes extend a major part of the perimeter of said cylinder and each tube is connected at its ends to said headers.

8. A heat exchanger as defined in claim 6, wherein said curved path comprises a plurality of portions together forming said cylinder, each portion comprising tube sections extending in a corresponding portion of the perimeter of the cylinder, each of the ends of each tube section being connected to a header for the distribution of said one heat exchange fluid.

9. A heat exchanger as defined in claim 1, wherein said curved path is at least partly frustoconical in shape.

10. A heat exchanger as defined in claim 9, wherein said curved path has a portion in the shape of a cylinder and a coaxial portion of frustoconical shape.

11. A heat exchanger as defined in claim 10, wherein said heat exchanger is divided into a plurality of peripheral sectors each supplied by a pair of headers placed respectively at their ends.

12. A fluid-fluid heat exchanger comprising a pair of headers, a plurality of flexible synthetic tubes, each of said plurality of tubes extending in a curved path between said pair of headers with the ends of each tube being in fluid communication with said pair of headers to provide a flow path between the headers for one of the heat exchange fluids, said plurality of tubes being further arranged in a plurality of spaced superimposed layers with the spaces therebetween providing a flow path for the other of the heat exchange fluids, a plurality of spaced generally radially disposed spacers engaging and maintaining the flexible tubes in their spaced superimposed layers and in their generally curved path, wherein each spacer has a generally plate shape disposed radially with respect to the curvature of said wall and each spacer having individual apertures for reception of the tubes of the exchanger, further wherein each spacer element is mounted to be movable relative to the radial plane in which it is disposed, and wherein said spacer element bears on rolling elements, the axes of which rolling elements are disposed normal to the plane of the spacer element.

* * * * *